United States Patent
Benson

(10) Patent No.: US 9,340,078 B2
(45) Date of Patent: May 17, 2016

(54) HYDRAULIC EQUALIZING SPREADER BAR WITH DUAL SPREAD LINKS

(71) Applicant: Fontaine Commercial Trailer, Inc., Haleyville (AL)

(72) Inventor: Gregory C. Benson, Pell City, AL (US)

(73) Assignee: Fontaine Commercial Trailer, Inc., Haleyville, AL (US)

( * ) Notice: Subject to any disclaimer, the term of this patent is extended or adjusted under 35 U.S.C. 154(b) by 0 days.

(21) Appl. No.: 14/450,003

(22) Filed: Aug. 1, 2014

(65) Prior Publication Data
US 2015/0035254 A1 Feb. 5, 2015

Related U.S. Application Data

(60) Provisional application No. 61/861,183, filed on Aug. 1, 2013.

(51) Int. Cl.
*B60D 1/46* (2006.01)
*B60D 1/167* (2006.01)
*B62D 53/06* (2006.01)
*B60D 1/24* (2006.01)

(52) U.S. Cl.
CPC .............. *B60D 1/1675* (2013.01); *B60D 1/246* (2013.01); *B60D 1/247* (2013.01); *B62D 53/062* (2013.01); *B62D 53/067* (2013.01); *Y10T 29/49826* (2015.01)

(58) Field of Classification Search
CPC ...... B60D 1/1675; B60D 1/247; B60D 1/246; B60D 1/40; B62D 53/062; B62D 53/063
See application file for complete search history.

(56) References Cited

U.S. PATENT DOCUMENTS

| | | | | |
|---|---|---|---|---|
| 3,837,665 A | * | 9/1974 | Schramm | B60D 1/167 280/43.18 |
| 3,894,747 A | * | 7/1975 | Wisdom | B62D 53/062 254/420 |
| 4,125,272 A | * | 11/1978 | Putnam, Jr. | B60D 1/40 280/479.3 |
| 4,474,359 A | * | 10/1984 | Weaver | B62D 53/062 254/8 C |
| 4,568,094 A | * | 2/1986 | Lovell | B60G 5/00 280/6.151 |
| 8,678,421 B1 | * | 3/2014 | Williams, Jr. | B60D 1/246 280/479.1 |
| 2002/0108763 A1 | * | 8/2002 | Knight | A01B 59/068 172/439 |
| 2008/0199293 A1 | * | 8/2008 | Santele | E02F 3/3686 414/685 |
| 2008/0264656 A1 | * | 10/2008 | Kapfer | A01B 59/004 172/439 |
| 2009/0272550 A1 | * | 11/2009 | Mozingo | A01B 59/066 172/1 |

* cited by examiner

*Primary Examiner* — Joseph Rocca
*Assistant Examiner* — Gabriela C Craciun
(74) *Attorney, Agent, or Firm* — Andrus Intellectual Property Law, LLP

(57) ABSTRACT

A spreader bar includes a frame having a leading end and a trailing end. A pivot member is pivotally mounted to the trailing end of the frame and adapted to be removably connected to a spreader bogie. Spread links adapted to be removably connected to a trailer are pivotally and removably attached to the leading end of the frame. The length of the spreader bar may be changed by substituting spread links having different lengths.

18 Claims, 7 Drawing Sheets

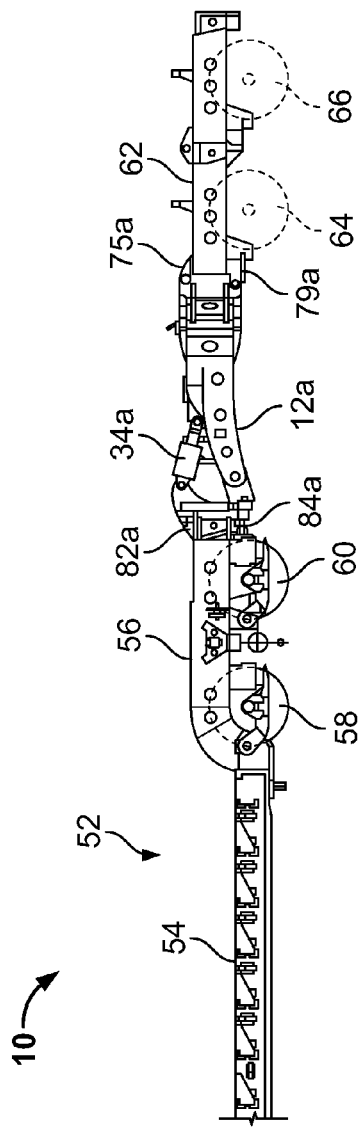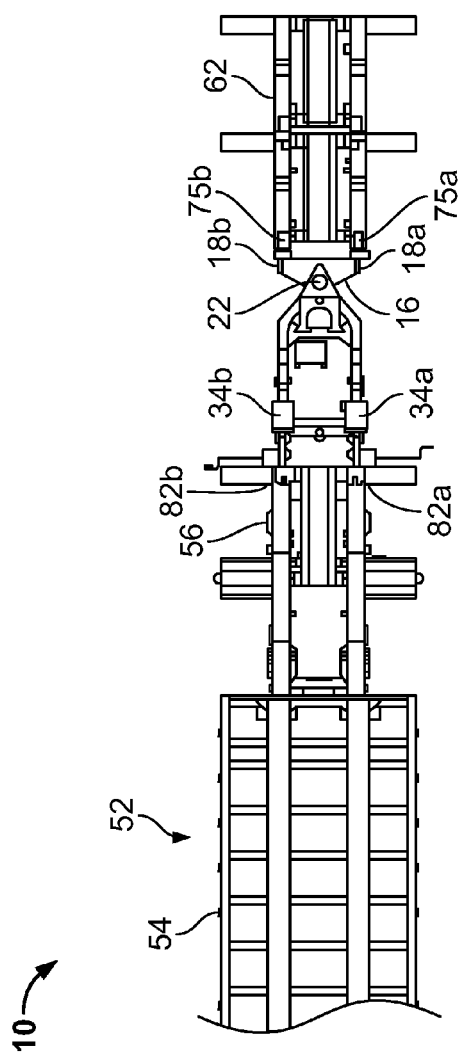

HYDRAULIC EQUALIZING SPREADER BAR WITH DUAL SPREAD LINKS

CROSS REFERENCE TO RELATED APPLICATIONS

This application claims priority from Provisional Patent Application No. 61/861,183 filed Aug. 1, 2013. The entirety of all the above-listed applications are incorporated herein by reference.

FIELD OF THE INVENTION

The present invention relates generally to trailers used in the trucking industry and, in particular, to a hydraulic equalizing spreader bar with dual spread links.

BACKGROUND

Trailers of the type towed by vehicles, such as tractor trucks or semis and the like, in the trucking industry are typically equipped with one or more base axles upon which the trailer wheels are mounted so that the trailer is supported on a roadway or other surface. State bridge laws provide additional axle loads when the trailer features groups of axles that are spread apart by a specific distance. In response, spreader bars have been developed for use in the trucking industry. A "spreader bar" is a structural component that divides the base trailer axles and two or more auxiliary axles by a given distance.

A spreader bar typically permits the spreader axles to turn left or right about a vertical spreader pin, and with respect to the trailer, so that the trailer with the attached spreader bar and spreader bogie, to which the spreader axle and wheel assemblies are mounted, can successfully negotiate turns. In addition, the pitch of the spreader bar with respect to the trailer may typically be adjusted so that the portion of the load weight supported by the spreader axle and wheel assemblies may be adjusted. The pitch may be adjusted by mechanical shims, such as with a rigid spreader, or through the use of hydraulics, such as with a hydraulic spreader. A hydraulic spreader offers the advantages of finite and variable pitch adjustment and also allows rotation left to right and up and down, which reduces stress on the trailer and the vertical spreader pin.

Bridge laws vary from state to state. Some states allow more load per axle for specified spread distances measured from the last (most rearward) base axle of the trailer to the first axle of the spreader axles. Typical specified spread distances are 14'-7" and 16'-1". In order to change between these two distances, prior art systems require either an entirely new spreader bar or an alternative spreader main steering head assembly. Both of these solutions are expensive and time consuming with regard to installation.

A need exists for a hydraulic spreader bar that addresses the above issues and that reduces cost and time for change over.

BRIEF DESCRIPTION OF THE DRAWINGS

FIG. 3 is a side elevational view of the spreader bar of FIGS. 1 and 2 installed to a trailer and a group of spreader axles;

FIG. 4 is a top plan view of the spreader bar, trailer and group of spreader axles of FIG. 3 with the wheels and axles omitted for clarity;

DETAILED DESCRIPTION OF EMBODIMENTS

Figure 1:
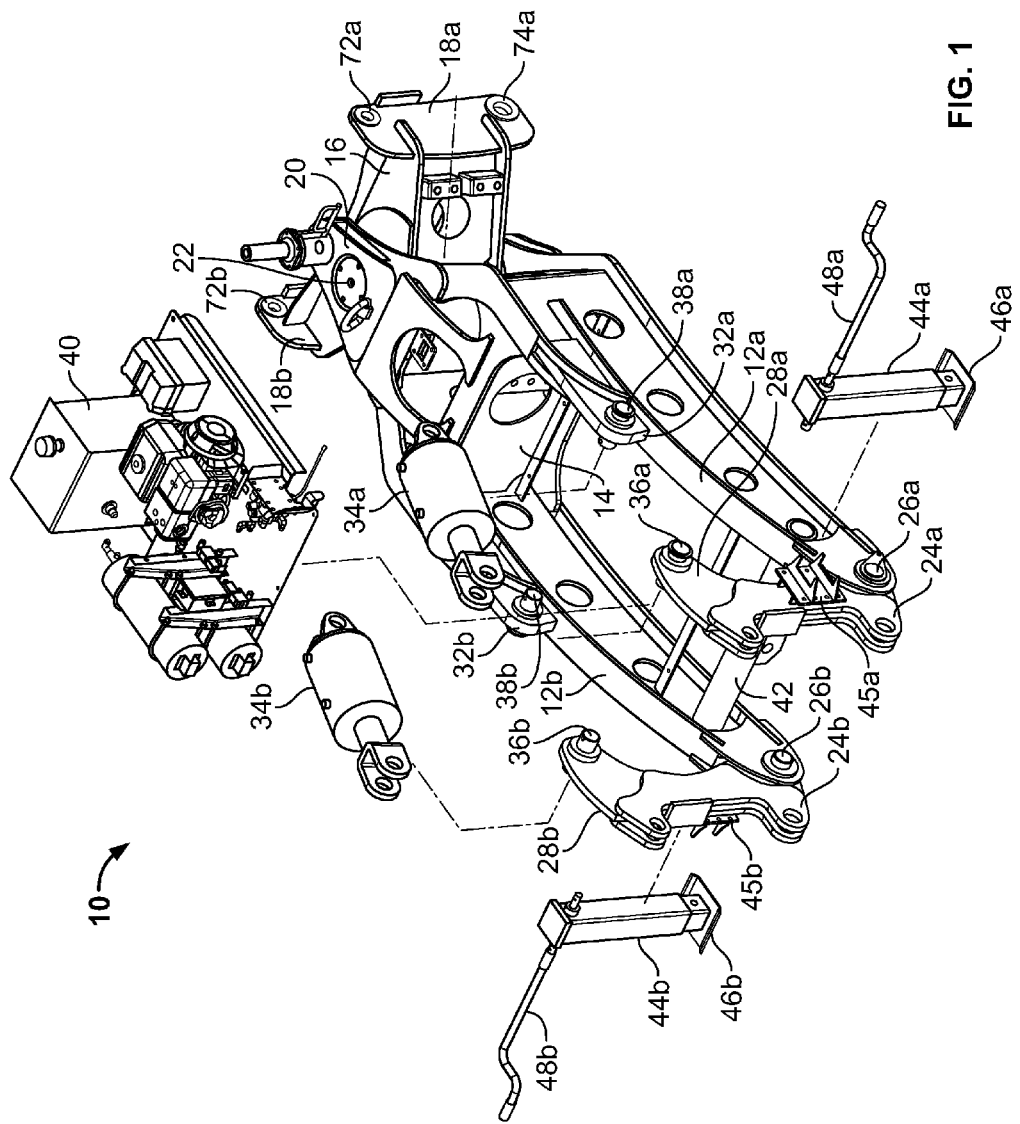
FIG. 1 is an exploded top perspective view of an embodiment of the spreader bar of the present invention.
Figure 2:
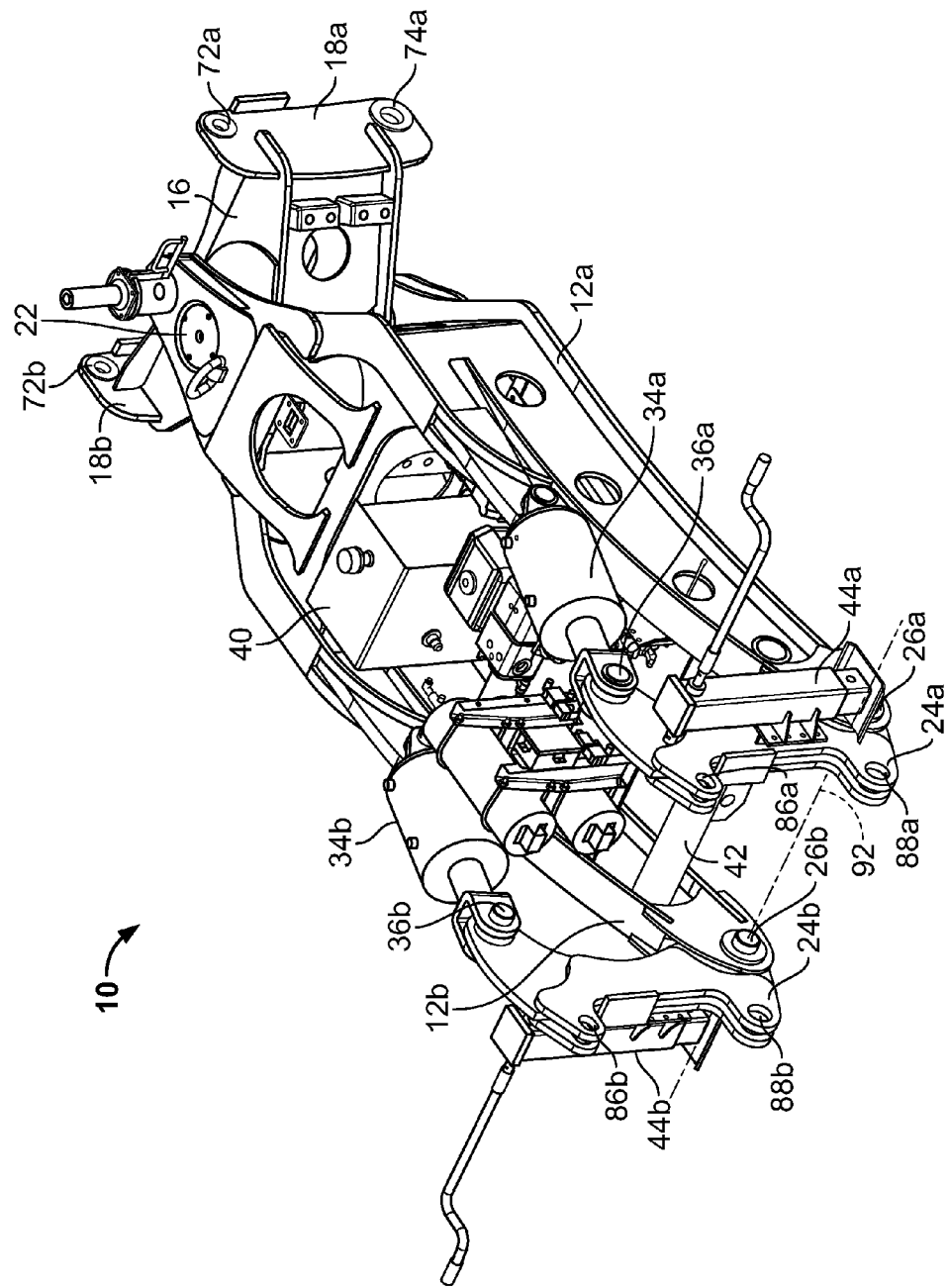
FIG. 2 is a top perspective view of the spreader bar of FIG. 1 in an assembled condition.

An embodiment of the spreader bar of the present invention is indicated in general at 10 in FIGS. 1 and 2. The spreader bar features a frame, preferably constructed from steel, that includes a pair of main beams 12a and 12b that are joined at their trailing ends by cross beam 14 so that a general U-shape is formed. A pivot member features a generally triangular-shaped body 16 and has a pair of mounting flanges 18a and 18b. The pivot member is mounted to the trailing end of the frame of the spreader bar by a pivot bracket 20 which supports a vertical spreader pin 22 to which the pivot member body 16 is pivotally mounted.

A pair of C-shaped spread links 24a and 24b (or C-links) are mounted to the leading ends of the main beams 12a and 12b. More specifically, the bottom portions of the C-links are pivotally attached to the leading ends of the main beams 12a and 12 by by bottom pins 26a and 26b. While the spread links will be described below as C-links, shapes other than the general C-shape illustrated may be used for the spread links.

The top portions of the C-links are provide with upper hydraulic cylinder upper brackets 28a and 28b, while the main beams of the frame are provided with hydraulic cylinder lower brackets 32a and 32b. A pair of hydraulic cylinders 34a and 34b are pivotally mounted between the hydraulic cylinder upper and lower brackets via top pins 36a and 36b and lower pins 38a and 38b. The hydraulic cylinders are powered by a spreader motor 40, which may be powered by electricity, gasoline or any other fuel known in the art. Alternatively, the hydraulic cylinders could be powered by systems on board the semi truck or other vehicle pulling the trailer.

As will be explained in greater detail below, the spread links or C-links 24a and 24b may be changed out to increase (or decrease) the spread distance provided by the spreader bar 10.

A support rod 42 extends between the leading end portions of the main beams to add strength and rigidity to the frame.

A pair of landing gear 44a and 44b are mounted to the C-links via landing gear brackets 45a and 45b. Each landing gear features a retractable base (46a and 46b) that is operated by a hand crank (48a and 48b). The landing gear may optionally be hydraulic powered in place of the hand cranks 48a and 48b and associated mechanisms.

The spreader bar 10 of FIGS. 1 and 2 is shown connected to a trailer bogie and a spreader bogie in FIGS. 3 and 4. More specifically, the rear portion of a trailer is indicated in general at 52 and features a trailer deck 54 and a trailer bogie 56. As illustrated in FIG. 3, a pair of base axle and wheel assemblies 58 and 60 are mounted to the trailer bogie. As will be explained in greater detail below, the leading end of the spreader bar 10 is connected to the trailer bogie 56 of the trailer. The trailing end of the spreader bar 10 is connected to a spreader bogie 62, to which spreader wheel and axle assemblies 64 and 66 are mounted.

Figure 5:
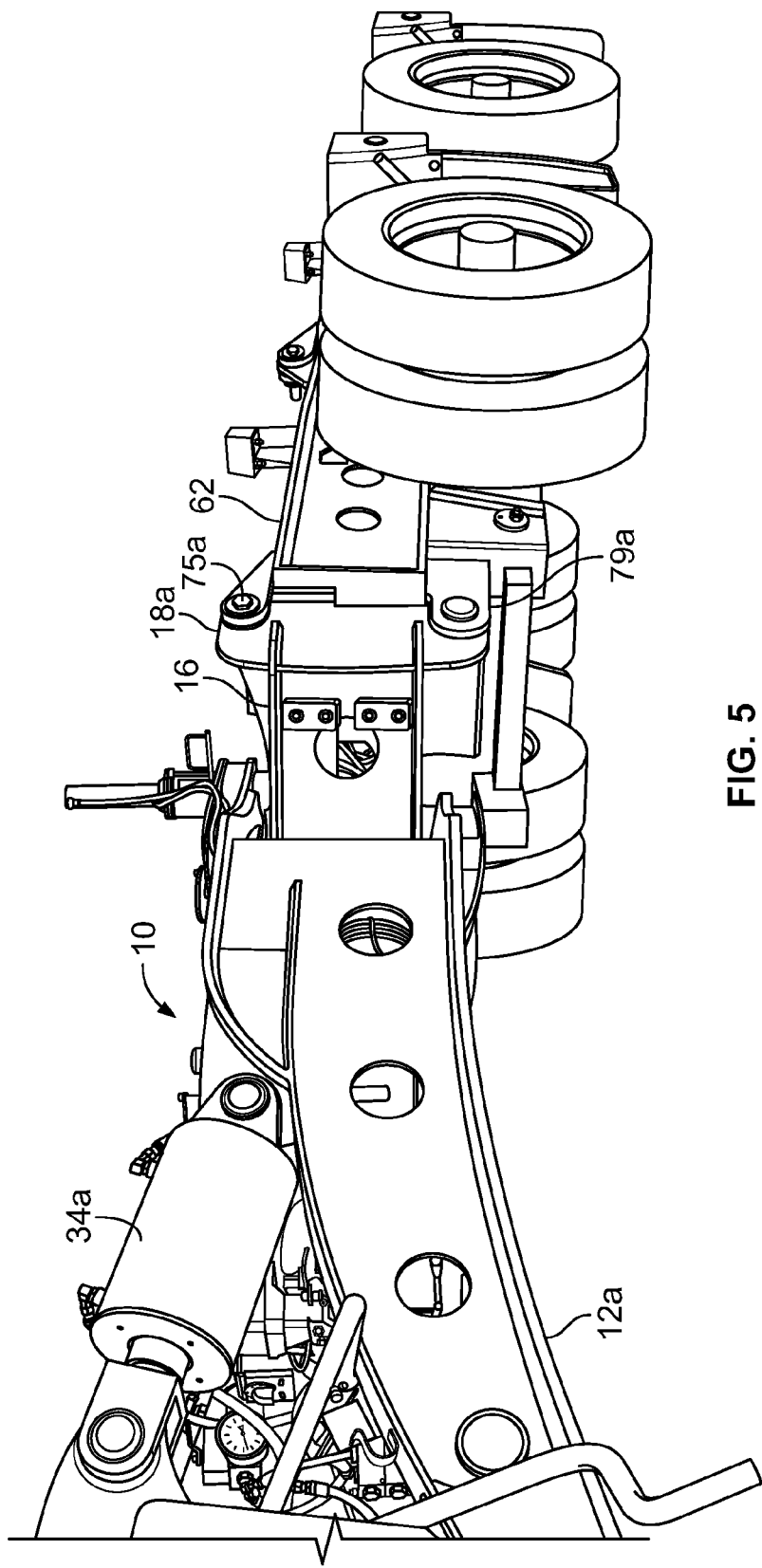
FIG. 5 is a side perspective view of the spreader bar of FIGS. 1-4 installed to a group of spreader axles.

As illustrated in FIGS. 3-5, the trailing end of the spreader bar 10 is mounted to the spreader bogie 62 by the pivot member mounting flanges 18a and 18b (see also FIGS. 1 and 2). More specifically, pins engage the openings 72a, 72b, 74a and 74b (FIGS. 1 and 2) of the spreader bar pivot member mounting flanges 18a and 18b as well as corresponding openings formed on spreader bogie brackets 75a, 79a, 75b and 79b (FIGS. 3-5), which are mounted on the spreader bogie 62. Washers and fastening pin retainers are attached to the pins to hold them within their corresponding openings.

Figure 6:
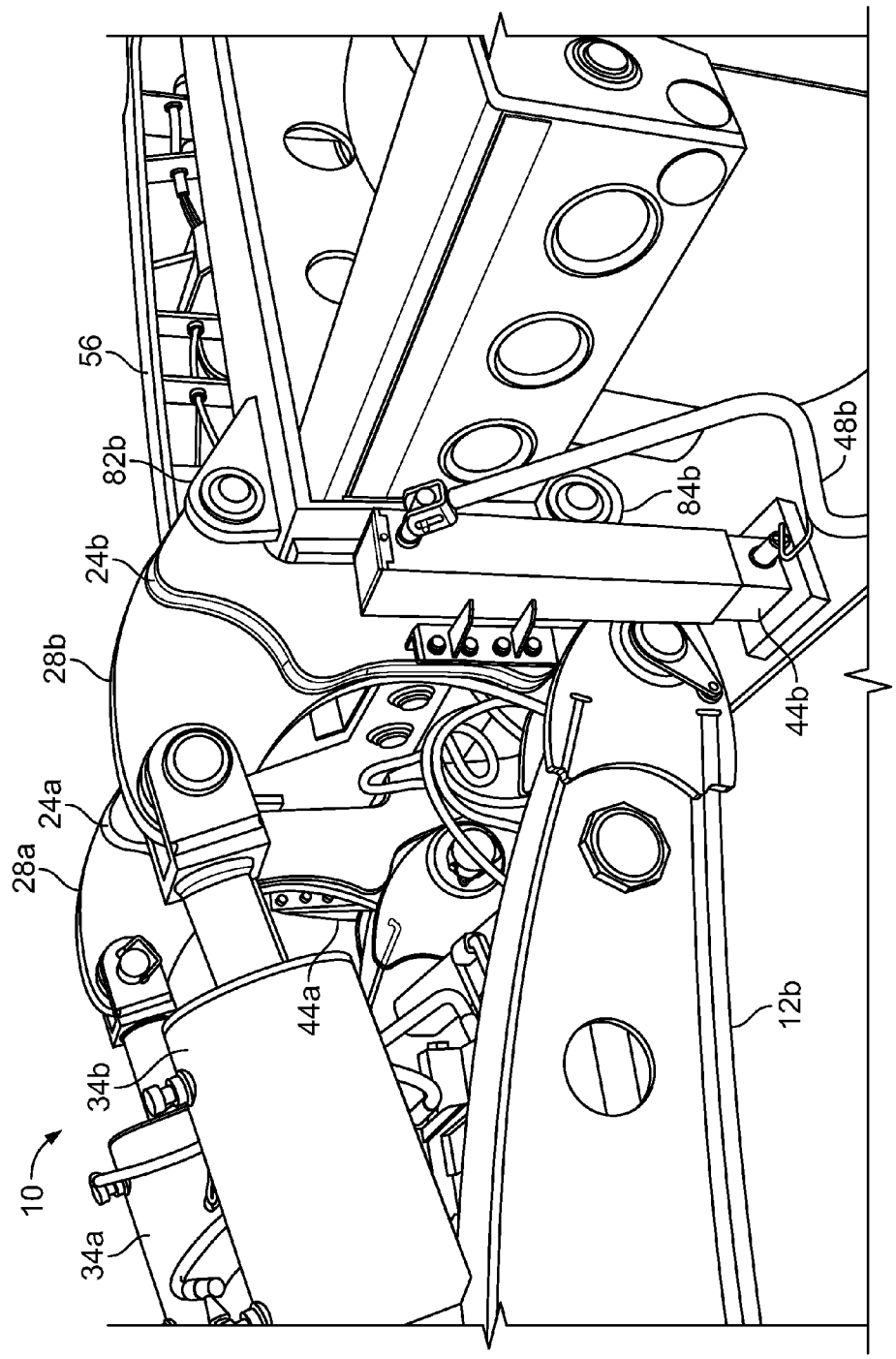
FIG. 6 is a side perspective view of the spreader bar of FIGS. 1-5 being installed to a trailer.
Figure 7:
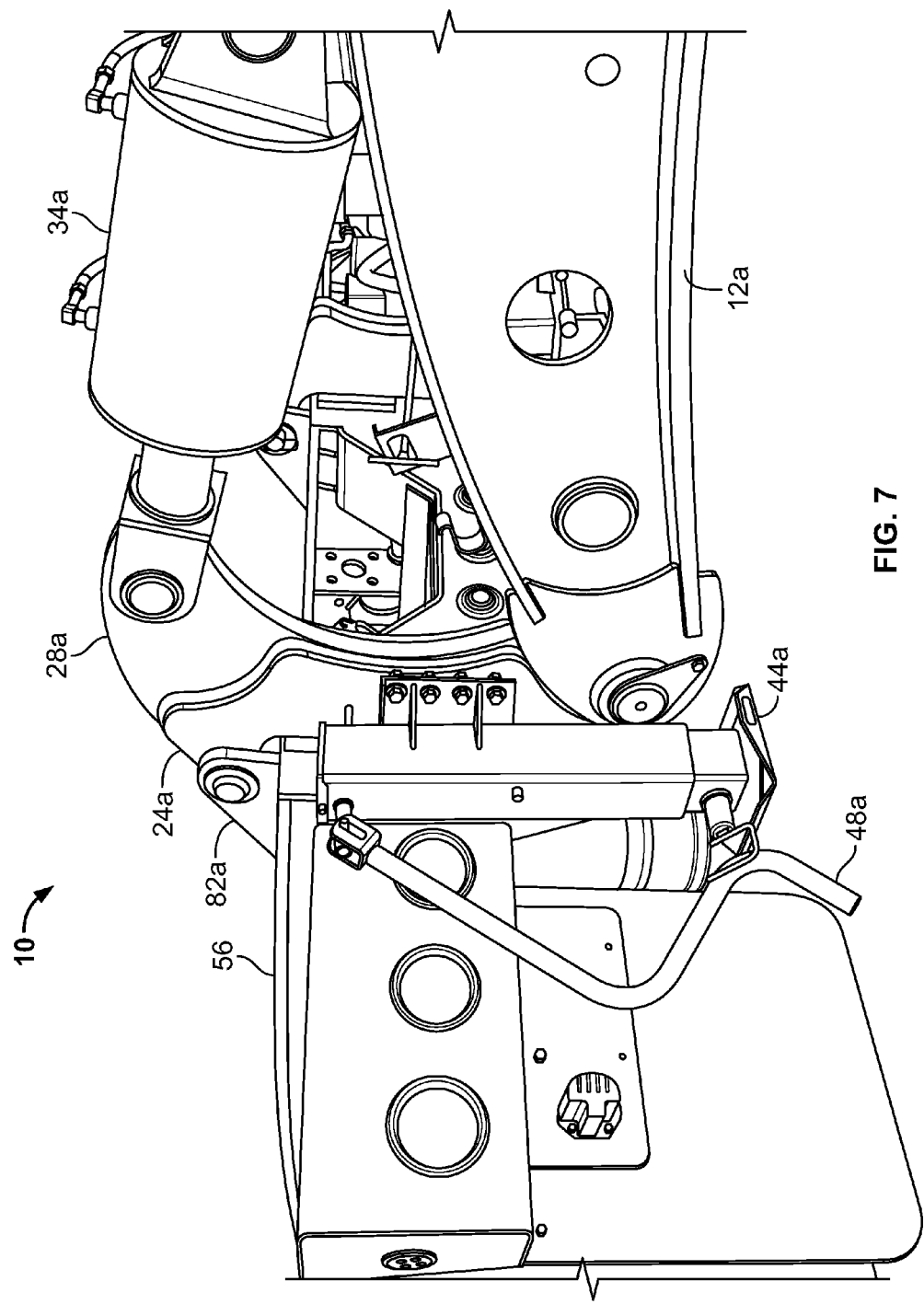
FIG. 7 is a side perspective view of the spreader bar of FIGS. 1-6 installed to a trailer.

Attachment of the C-links (24a and 24b of FIGS. 1 and 2) of the leading end of the spreader bar to the trailer bogie is illustrated in FIGS. 6 and 7. As illustrated in FIGS. 3, 4, 6 and 7, the trailer bogie 56 is provided with brackets 82a, 82b, 84a and 84b, with each having a pin opening. As illustrated in FIG. 2, the C-links 24a and 24b are provided with openings 86a, 86b, 88a and 88b. As illustrated in FIG. 6, the landing gear 44a and 44b is used to position the C-links at the appropriate height so that they are aligned with brackets 82a, 82b, 84a and 84b of the trailer bogie 56. The independent landing gear 44a and 44b allow pin connects to be made on un-level terrain. Next, pins are inserted through the openings of the C-links and the corresponding openings of the trailer bogie brackets. Washers and fastening pin retainers are attached to the pins to hold them within their corresponding openings. As a result, the spreader bar C-links are attached to the trailer bogie, and the landing gear bases may be retracted, as illustrated for landing gear 44a in FIG. 7.

The trailer load is equalized between the trailer bogie axle and wheel assemblies and the spreader bogie wheel and axle assemblies by starting the spreader motor (40 of FIGS. 1 and 2), which, as is known in the art, pumps or otherwise provides pressurized hydraulic fluid to hydraulic cylinders 34a and 34b. The spreader hydraulic cylinders 34a and 34b therefore may be used to put pressure on the spreader wheel and axle assemblies by rotating the C-links with respect to the frame about a generally horizontal axis, illustrated in phantom at 92 in FIG. 2. In addition, the hydraulic cylinders 34a and 34b provide the ability to lift both spreader axle and wheel assemblies (64 and 66 of FIG. 3) off of the ground, again by rotation about axis 92 of FIG. 2, for ease of backing in tight spaces.

Figure 8:
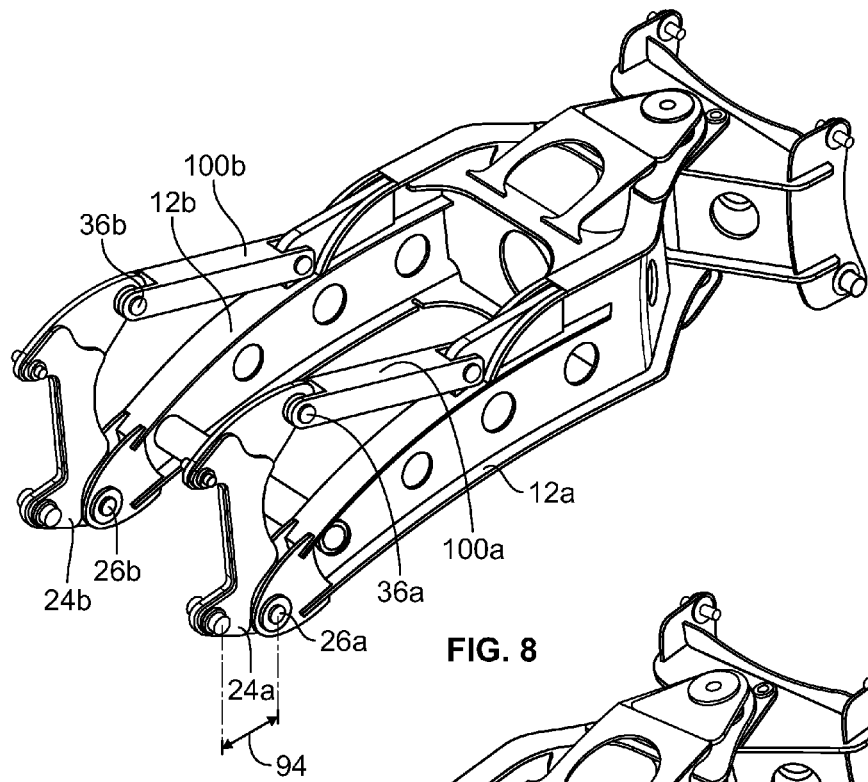
FIG. 8 is a simplified perspective view of the frame portion of the spreader bars of FIGS. 1-7 with C-shaped spread links installed that provide a 14'-7" spread distance configuration.
Figure 9:
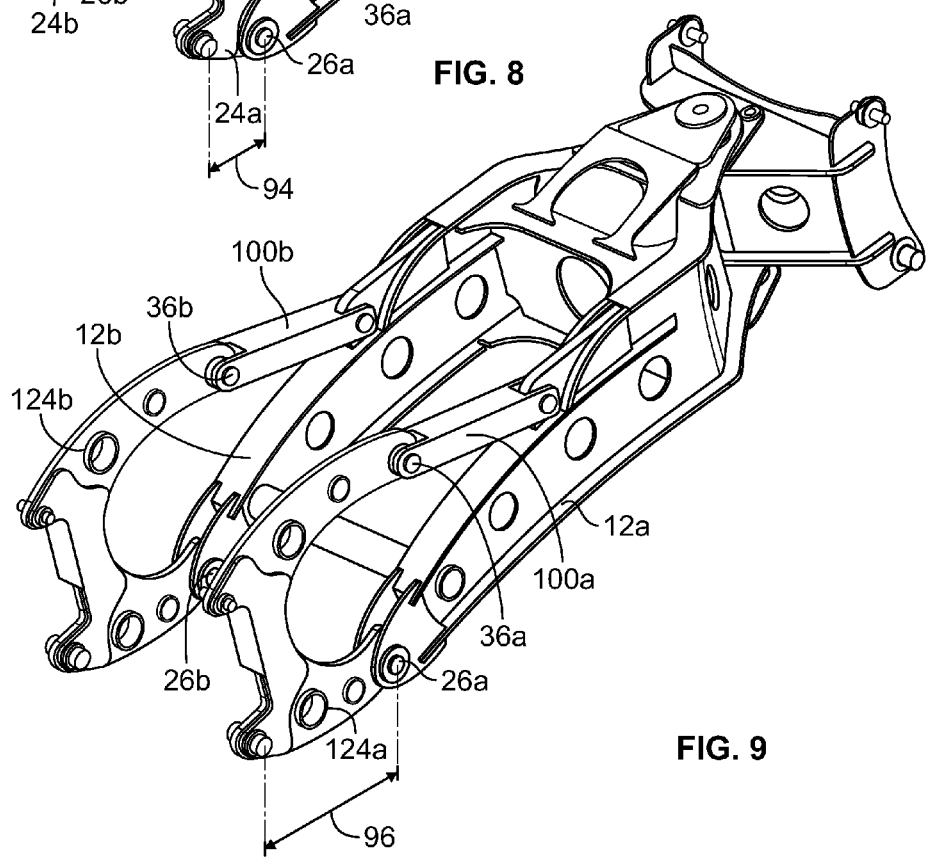
FIG. 9 is a simplified perspective view of the frame portion of the spreader bars of FIGS. 1-7 with C-shaped spread links installed that provide a 16'-1" spread distance configuration.

With reference to FIGS. 8 and 9, the spread links or C-links of the spreader bar may be exchanged to change the spread distance provided by the spreader bar. It should be noted that links 100a and 100b in FIGS. 8 and 9 may be replaced with hydraulic cylinders 34a and 34b of FIGS. 1-7 in alternative embodiments. In the case of the spreader bar of FIG. 8, a spread distance of 14'-7" is provided in part by C-links 24a and 24b having a length indicated by arrows 94. The C-links 124a and 124b of FIG. 9, having a length indicated by arrows 96, may be substituted for the C-links 24a and 24b of FIG. 8 to provide a spread distance of 16'-1". This is accomplished simply by removing and reinstalling top pins 36a and 36b and bottom pins 26a and 26b. It is to be understood that the spread distances of 14'-7" and 16'-1" are provided as examples only, and that the C-links and main beams 12a and 12b of the spreader bar could be sized and/or shaped to provide alternative spread distances.

As a result, the spreader bar of the present invention may be quickly, easily and safely converted to provide a variety of spread distances by swapping out the C-links.

While the preferred embodiments of the invention have been shown and described, it will be apparent to those skilled in the art that changes and modifications may be made therein without departing from the spirit of the invention, the scope of which is defined by the following claims.

What is claimed is:

1. A spreader bar comprising:
   a. a frame having a leading end and a trailing end;
   b. a pivot member pivotally mounted to the trailing end of the frame and adapted to be removably connected to a spreader bogie, wherein the pivot member includes a triangular shaped body with a pair of mounting flanges connected thereto, said pair of mounting flanges being adapted to be removably connected to the spreader bogie;
   c. a spread link adapted to be removably connected to a trailer and pivotally and removably attached to the leading end of the frame.

2. The spreader bar of claim 1 further comprising a hydraulic cylinder mounted between the spread link and the frame so that actuation of the hydraulic cylinder causes the frame to pivot about a generally horizontal axis with respect to the spread link.

3. The spreader bar of claim 1 wherein the frame includes a pair of main beams having leading and trailing ends and wherein the spread link includes first and second spread links pivotally and removably attached to the leading ends of the main beams, said first and second spread links each adapted to be removably connected to the trailer.

4. The spreader bar of claim 3 wherein the frame features a cross beam and is generally U-shaped.

5. The spreader bar of claim 1 further comprising a landing gear with a retractable base attached to the spread link.

6. The spreader bar of claim 1 wherein the pivot member is secured to the frame by a vertical spreader pin.

7. The spreader bar of claim 6 further comprising a pivot bracket attached to the trailing end of the frame, said pivot bracket receiving the vertical spreader pin.

8. The spreader bar of claim 1 wherein the spread link is removably and pivotally attached to the frame by removable pins.

9. The spreader bar of claim 1 wherein the spread link has an upper portion and a lower portion and wherein the lower portion is connected to the leading end of the frame by a removable pin and further comprising a hydraulic cylinder mounted between the upper portion of the spread link and the frame so that actuation of the hydraulic cylinder causes the frame to pivot about a generally horizontal axis with respect to the spread link.

10. The spreader bar of claim 9 wherein the spread link features a C-shape.

11. The spreader bar of claim 1 wherein the spread link features a C-shape.

12. The spreader bar of claim 1 wherein the spread link includes a pair of spread links adapted to be removably connected to the trailer and pivotally and removably attached to the leading end of the frame and further comprising a pair of hydraulic cylinders mounted between the pair of spread links and the frame so that actuation of the pair of hydraulic cylinders causes the frame to pivot about a generally horizontal axis with respect to the pair of spread links.

13. A method for attaching a spreader bogie to a trailer comprising the steps of:
   a. providing a spreader bar having a frame having a leading end and a trailing end with a pivot member pivotally mounted to the trailing end of the of the frame and a spread link pivotally and removably attached to the leading end of the frame;
   b. connecting the pivot member to the spreader bogie, wherein the pivot member includes a triangular shaped body with a pair of mounting flanges connected thereto, said pair of mounting flanges being adapted to be removably connected to the spreader bogie; and c. connecting the spread link to the trailer.

14. The method of claim 13 wherein the spreader bar also includes a hydraulic cylinder mounted between the spread link and the frame and further comprising the step of:

d. actuating the hydraulic cylinder to cause the frame to pivot about a generally horizontal axis with respect to the spread link.

15. The method of claim 13 wherein the spread link includes a pair of spread links.

16. A method for changing a length of a spreader bar comprising the steps of:

a. providing a spreader bar having a frame having a leading end and a trailing end with a pivot member pivotally mounted to the trailing end of the of the frame and a first spread link having a first length and a second spread link having a second length that differs from the first length;

b. removably and pivotally attaching the first spread link to the leading end of the frame;

c. connecting the pivot member to a spreader bogie, wherein the pivot member includes a triangular shaped body with a pair of mounting flanges connected thereto, said pair of mounting flanges being adapted to be removably connected to the spreader bogie; and d. connecting the first spread link to a trailer;

e. disconnecting the first spread link from the trailer;

f. disconnecting the first spread link from the leading end of the frame;

g. removably and pivotally attaching the second spread link to the leading end of the frame;

h. connecting the second spread link to the trailer.

17. The method of claim 16 wherein step c. includes using a pin.

18. The method of claim 16 wherein steps d. and h. each include using a pin.

* * * * *

UNITED STATES PATENT AND TRADEMARK OFFICE
CERTIFICATE OF CORRECTION

| | | |
|---|---|---|
| PATENT NO. | : 9,340,078 B2 | Page 1 of 1 |
| APPLICATION NO. | : 14/450003 | |
| DATED | : May 17, 2016 | |
| INVENTOR(S) | : Gregory C. Benson | |

It is certified that error appears in the above-identified patent and that said Letters Patent is hereby corrected as shown below:

In the claims

In claim 13, at column 4, line 63, the second occurrence of the words "of the" should be deleted;

In claim 16, at column 5, line 17, the second occurrence of the words "of the" should be deleted.

Signed and Sealed this
Ninth Day of August, 2016

Michelle K. Lee
*Director of the United States Patent and Trademark Office*